MAGNETO-PIEZO ELECTROMECHANICAL FILTER

Filed May 20, 1966 2 Sheets-Sheet 1

Harold P. Boettcher &
Andrew C. Thompson INVENTORS

BY George E. Szekely
ATTORNEY

MAGNETO-PIEZO ELECTROMECHANICAL FILTER

Filed May 20, 1966

Harold P. Boettcher &
Andrew C. Thompson INVENTORS

BY George E. Szekely
ATTORNEY

United States Patent Office 3,539,952
Patented Nov. 10, 1970

3,539,952
MAGNETO-PIEZO ELECTROMECHANICAL FILTER
Harold P. Boettcher, Brookfield, Wis., and Andrew C. Thompson, Wonder Lake, Ill. (2455 NE. 51st, Apt. E-109, Fort Lauderdale, Fla. 33308); said Boettcher assignor to said Thompson
Filed May 20, 1966, Ser. No. 551,671
Int. Cl. H03h 9/00
U.S. Cl. 333—72 5 Claims

ABSTRACT OF THE DISCLOSURE

An electromechanical filter is built as a composite of magnetostrictive and electrostrictive elements, bonded together for resonance as a unitary member. The member is proportioned for peak resonance in selected mode at the desired frequency. The mode and frequency are established by appropriate dimensioning of the member and its elements, and the manner of support. An input coil drives the member by exciting the magnetostrictor. The electrostrictor, or piezo element, resonates integrally with the magnetostrictor, transducing the resultant mechanical stress wave to electrical output at the resonant frequency, with voltage corresponding to the stress characteristic and amplitude. A substantially dimensionless bond at a neutral or nodal plane virtually precludes coupling loss between the elements.

Our invention relates to an electromechanical filter of the band-pass type, such as used principally in circuitry of electronic communications equipment, although not limited thereto.

Electromechanical filters are designed and constructed on the broad principle that a pulsating current or magnetic field will excite a resonant element of suitable properties to vibrate with significant amplitude at a frequency of natural resonance corresponding to a selected input frequency, or harmonic thereof. Non-resonant frequencies are attenuated. In practice, substantial resonance may be produced across a more or less wide band of frequencies including the theoretical natural resonant frequency of the element. Desired filter characteristics may be established by appropriate choice of materials, construction, damping, tuning and related design factors. By the converse principle, when suitably connected in a circuit, the mechanical resonator will produce a pulsating electrical output at selected frequencies.

A number of filter designs based on the foregoing principles have been proposed. These prior electromechanical filters have had only limited commercial success, despite theoretical advantages over network filters or electronic chokes. Materials of suitable properties are generally costly and difficult to fabricate. Furthermore, strength and structural limitations of the prior filters have precluded their commercial adaptation to the lower frequencies in the audio and sub-audio ranges. For low frequency, any given basic design inherently requires increased dimensions, as compared with the same design proportioned for high frequency. Dimensional problems with low frequency filters may be minimized by resonating strips in a flexural mode, preferably with magnetostrictive drive, which has been found generally the most practical and efficient for filters of the type here involved. However, no practicable means has heretofore been known for establishing the separate, opposing fields required to cause flexure of a homogeneously magnetostrictive material, or otherwise to produce flexural resonance by magnetostriction. To our knowledge, no practicable low frequency, electro-mechanical band-pass filter has hitherto been devised.

It is a principal object of our invention to provide a simple, compact electromechanical filter, particularly suitable for low frequencies, of the audio and sub-audio ranges, though not limited thereto.

It is another object of our invention to provide an electromechanical filter which is inexpensive, yet of acceptable precision and durability.

It is a further object of our invention to provide a filter in which input and output are electromechanically dissimilar, or non-reciprocal, whereby excitation is unidirectional, minimizing hazards of misconnection or inadvertent driving in the wrong direction.

These and other objectives of the invention are achieved by constructing the filter element as a sandwich of materials having dissimilar magneto-electric properties, such as a magnetostrictive and a piezo-electric material, for example. The two members are bonded together so that they comprise a unitary resonant element, one member responsive to excitation by the input and the other being thereby resonantly driven to produce the desired output, at preselected frequency. The elastic characteristics and proportions of the members are chosen to provide unitary resonance at the predetermined frequency, in a mode established by the proportions and mounting of the structure. With the magnetostrictive/piezo-electric combination, pulsating current input to a coil surrounding the element produces a pulsating magnetic field, causing extension and contraction of the driver at resonant frequency, while the driven member excites an output voltage of that frequency. Such construction is particularly adaptable to resonance at a low frequency in flexural mode, with practicable dimensions of the element. However, similar structures, suitably proportioned, are advantageous for longitudinal or other modes, over a substantial range of frequencies.

The foregoing and other objects and advantages of our invention will be apparent from the ensuing description, in conjunction with the appended drawings, in which.

In contrast to electromechanical filters or transducers heretofore generally utilized, the filter according to this invention has its output of a different character from its input, thus functioning as a transformer-filter. In one form of previous electromechanical filters current input to a coil excites a mechanical response by the phenomenon of magnetostriction and a converse response at an output coil causes current flow to the load. In another form piezo-electric or electrostrictive response is utilized to transduce input voltage to load voltage in preselected frequency or band, according to the natural mechanical resonance of the transducer. Transducers of the latter general type have also been employed as voltage transformers.

In preferred forms of our invention current input is used for excitation of the mechanical response, which produces a desired voltage as output. Such transformation is a useful one in many communications system networks. The objective is most conveniently and satisfactorily achieved by constructing the transducer element as a composite of two materials having dissimilar electromechanical properties, one solely or essentially magnetostrictive, the other solely or essentially electrostrictive. Properties of the first kind are found in various iron-nickel compounds or ferrites, while properties of the second kind are exhibited by piezo-electric crystalline materials, quartz for example, and certain polarizable ceramic compounds, notably titanates.

Mechanical coupling of magnetostrictive and electrostrictive materials has been postulated in transducer generally referred to as a "gyrator," whose transduction is non-reciprocal, for reasons stated by E. N. McMillan in his article at pp. 344–347 of the Journal, Acoustical Society of America, vol. 18, 1946. However, efforts to produce a useful form of such "gyrator" have heretofore been unsuccessful. We have discovered that the critical transduction coefficients of most previously known magnetostrictive and electrostrictive materials are incompatible in any mechanically practical structure, the combination being too lossy, but by coupling certain recently developed materials in our novel forms and structures, we have achieved transducers of useful characteristics.

Figure 1:
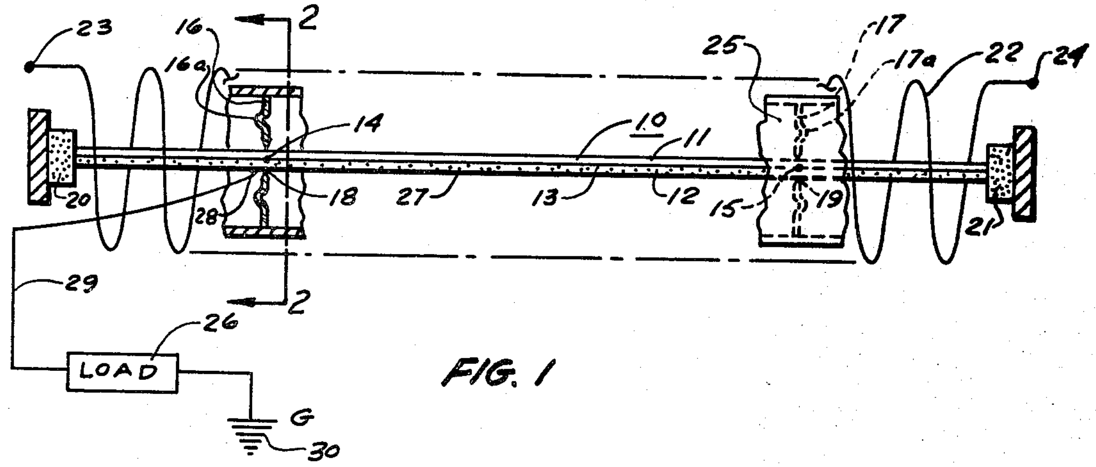
FIG. 1 is a front elevation of a filter in accordance with our invention, the resonant element arranged for free-free flexure, some parts shown in section or fragmentally.
Figure 2:
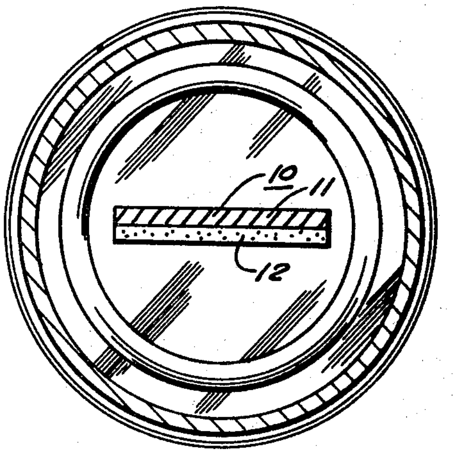
FIG. 2 is an enlarged transverse section of the resonant member on line 2—2 of FIG. 1.

Referring now to FIGS. 1 and 2, which show one form of our invention, member 10 is the transduction element of a filter structure. Member 10 comprises two strips 11 and 12, preferably coextensive as shown, bonded at the interface 13, over the entire extent thereof. For reasons which will be later apparent, the bond at 13 should be the substantial mechanical equivalent of a weld. We have found that epoxy cement, applied in an extremely thin coat, serves the purpose effectively, whereby member 10 responds elastically as without discontinuity at the interface 13, albeit the elastic properties of strips 11 and 12 are inherently different, and the molecular structure non-homogenous.

Figure 3:
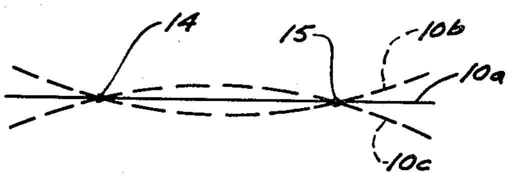
FIG. 3 is a diagrammatic view of the resonant member positioned as in FIG. 1, illustrating the flexure mode.

The dimensions of member 10 are in this instance established, by a method hereinafter described, to effect natural resonance at a preselected frequency when vibrating in lateral or flexural mode, as a free-free beam. This mode is illustrated diagrammatically in FIG. 3, wherein 10*a* designates the normal straight position of member 10, while 10*b* and 10*c* represent the symmetrical, flexed positions at extremes of amplitude, which is exaggerated for purposes of illustration. The nodes are indicated by points 14, 15, which, by conventional flexure theory, lie at distances of $.224l$ from the ends of the beam, where $l$ is the overall length of the beam.

A practical suspension of a beam for substantially true free-free flexure condition can be achieved by thin supports in the nodal transverse planes. For this purpose we use wafers 16, 17, FIG. 1, which hold member 10 on knife-edged slots 18, 19. While nodes 14, 15 have no translatory motion upon flexure of member 10, the nodal planes rotate about the nodes as centers. The support edges of wafers 16, 17 must follow the rotative movement of the nodal planes, to obviate variation in the resonant frequency of member 10. Since practical considerations dictate that the supports have a finite thickness at the contact edges, the wafers 16, 17 must be made of such material as will absorb the resultant distortions with minimal damping of the desired mode, yet sufficiently restraining lateral or axial movements which may be induced in spurious modes. We find that silicone rubber or synthetic foams, such as polyurethane, have properties suitable for wafers 16, 17. Crimps 16*a*, 17*a* provide increased radial elasticity of supports 16 and 17 respectively, for minimal, but positive and uniform, contact pressure on member 10 through the full range of nodal plane revolution, resulting upon flexure of member 10. Conversely, stiffening of the supports 16 and 17, axially of member 10, provides resistance against displacement of the support contact planes from the nodal planes, during assembly and operation.

It is desirable to provide buffers 20, 21 at the ends of member 10, to hold member 10 in its intended axial position and to damp any vibration which may be induced in a longitudinal mode. The buffers also may be used to make minor frequency adjustments, the end pressure and consequent resistance to flexure having the effect of added mass at the beam ends. However, the material and proportions of buffers 20, 21 should be such that the load/deflection ratio in shear is small, while that in compression is more substantial. Material which is similar to that used in supports 16, 17 has been found satisfactory; making the buffers 20, 21 deep in proportion to the transverse dimension provides the desired flexibility in the direction of beam flexure.

Coil 22 surrounds member 10 and is connected to the current source at terminals 23, 24. Coil 22 is wound on a core 25, of non-magnetic material, and quite thin, to be readily penetrable by the flux produced when current passes through the coil. Strip 11 is formed from material having a high magnetostrictive coefficient, such as a ferrite, for example. If strip 11 is subjected to an alternating flux, the strip expands and contracts at the input current-flux frequency. This vibratory phenomenon occurs symmetrically throughout the mass at any frequency. Due to internal and boundary resistance, the amplitude of vibration is normally quite small, but if the piece is so shaped, mounted and coupled as to be mechanically resonant in a particular mode at a particular frequency, the amplitude of vibration in such mode at such frequency is greatly increased.

As previously stated, the structure of FIG. 1 is designed to establish natural mechanical resonance of member 10 in the lateral, or flexural, mode, at a predetermined frequency, member 10 comprising magnetostrictive strip 11 bonded to strip 12. The latter is formed of an electrostrictive or piezo-electric material, such as quartz, a titanate, or the like, the assemblage being suspended in the field of coil 22. However, electrostrictive materials are characteristically unaffected by magnetic fields. Therefore, strip 12 resists the extension/contraction effects imposed on strip 11 by the field of coil 22. The resistive effect creates a couple, whose imposition longitudinally of member 10 results in its flexure. If now member 10 is flexurally resonant at a desired input frequency and appropriately transmissive, it will efficiently pass electrical energy at the selected frequency, but reject or materially attenuate non-resonant frequencies.

Upon flexure of member 10, an electric potential develops in strip 12, the voltage being a function of the stress along the line of polarization. Stress in an elastic body being a function of strain, the voltage will be greatest at the amplitude peaks when member 10 vibrates at resonant frequency. For the free-free beam the resonant frequency for the fundamental mode of vibration is $$f_r = 1.133\pi I\sqrt{E}/l^2 A\sqrt{\rho} \qquad (1)$$

wherein I is the cross-sectional moment of inertia, E is the modulus of elasticity of the member material, $l$ is the length of the member, A is the cross-sectional area, and $\rho$ is the density of the material. It will be seen that for a predetermined value of $f_r$, the dimensional factors of the radius of gyration $(I/A)$ and length are functions of E and $\rho$. The latter properties are known, or readily determinable, for materials such as here contemplated. However, member 10 being a composite of materials having different physical properties, solution of the foregoing equation requires the determination of substituent, composite physical properties.

A rigorous application of accepted theories of elasticity involves complex formulae for solution of problems with composite beams. However, experience with such structural members as reinforced concrete beams has demonstrated that certain assumptions may be made, leading to satisfactory near approximations. We have found that filter member 10 exhibits composite properties which can be closely determined on the basis of the following such assumptions: (1) Strips 11, 12, properly bonded, act as a unitary beam, (2) unit stress is proportional to unit strain, (3) unit strain varies directly with distance from the neutral axis, (4) transverse plane sections remain plane after flexure, and (5) the thicknesses of the strips 11, 12 are to be so related that the neutral axis is the plane of the interface 13. The latter assumption not only simplifies analysis and formulation, but establishes a condition whereby the bond at interface 13 is theoretically free of delamination stress due to flexure.

Pursuing the usual graphical analysis of the beam section, based on the foregoing assumptions, counterforces under flexure are equated for equilibrium about the neutral axis. That is, $T=C$, wherein T is the tensile force in one strip and C is the compressive force in the other. On the basis of the assumed stress/strain distribution, the strips being of equal width, the force in each is a function of its respective elastic modulus and (thickness).[2] Therefore, for equilibrium, $$E_m t_m^2 = E_e t_e^2, \text{ or } t_m = t_e\sqrt{E_e/E_m} \qquad (2), (3)$$

wherein $t$ is thickness of the strip and E is the modulus of elasticity of the strip material, subscripts $m$ and $e$ designating magnetostrictive and electrostrictive strips respectively. Total thickness of member 10, $$t = t_e + t_m = t_e + t_e\sqrt{E_e/E_m} = t_e[1+\sqrt{E_e/E_m}] \qquad (4)$$

the bracketed expression constituting a modification factor for stating the composite thickness in terms of one of its components, as an equivalent for use in the frequency formula above given.

Using similar analytical methods with respect to the dissimilar properties E and $e$ in the two strips, and substituting for equivalents in Formula 1. the latter becomes:

$$l^2 = \frac{1.133t_e}{f_r\sqrt{6}} \cdot \sqrt{E_e/\rho_e} \cdot \left\{\frac{[1+(E_e/E_m)][1+\sqrt{E_e/E_m}]}{1+(E_e\rho_m/E_m\rho_e)}\right\}^{1/2} \qquad (5)$$

All terms are as previously designated. Width of member 10 is selected for safe maximum stress. Obviously, the foregoing formula may be differently expressed, through factoring, inversion or substitution. The expression in terms of $t_e$ is preferred, because the latter is a particularly critical dimension, functionally and structurally, best serving as a first predicate from which to determine the materials and dimensions of member 10 for a particular frequency. Having established a combination of materials and thickness ratio satisfying the condition that the flexural neutral axis is in the interface plane, calculations for optimum dimensions at various frequencies can be made with the reduction:

$$l^2 = Kt_e/f_r \qquad (6)$$

wherein K is a constant for the combination. It will also be understood that analyses similar to the foregoing lead to formulae for other shapes or modes.

As previously stated, the given analysis and formulae are only near approximations. However, they are useful for preliminary calculations and selection of the component materials from which to construct filters for a wide variety of frequencies and modes. Exact lengths and other details for specific frequencies can then readily be determined empirically. For example, the assumption that the neutral axis of flexure is the interface plane 13 necessarily presents a departure from actual behavior. Since flexure is induced by resistance of strip 12 to longitudinal strain in strip 11, there is some stress in the plane of interface 13, inconsistent with its neutrality under flexure. This stress is of the same sign as that of the departure and is of such low order that it is readily compensated by an empirical correction.

FIGS. 1 and 2 show an ultra-low-frequency (ULF) filter, such as required for signal frequencies within the range of power line interference. Ferrite is preferred for strip 11 and lead zirconate titanate for strip 12. Applying principles and formulas above given, 0.065" thick strip 11 and 0.050" thick strip 12 satisfy desired flexural conditions, using a ferrite having dielectric constant $k_{33}$ in the range 0.15–0.33 and titanate having a radial dielectric constant about 0.53. For member 10 so constituted, $l=7''$ at $f_r=255$ c.p.s., Formula 5. A ¾" width of member 10 safely accepts stress required for 10 mv. output of strip 12.

Figure 4:
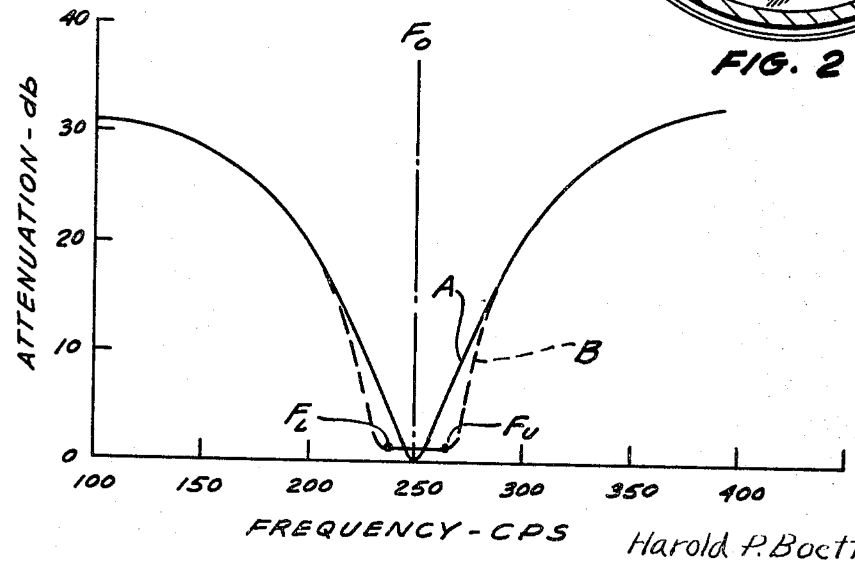
FIG. 4 is a graph showing a typical response characteristic of a filter according to FIG. 1.

A filter of the foregoing specifications exhibits a characteristic represented by curve A, FIG. 4. About 100 milliamp input to coil 22, FIG. 1, produces 10 mv. output at peak resonant frequency, $F_o$. However, the narrow pass band and relatively gradual side band attenuation of characteristic curve A may be unsuitable for some applications in practice. The characteristic curve B, indicated by superposed broken lines is produced by substituting in strip 12 a titanate having a slightly lower dielectric constant, with correspondingly higher Q and less lossy response, resulting in wider pass band $F_L$–$F_U$, sharper side band attenuation and lower input for given output. It will be understood that various characteristics can be achieved by appropriate selection of materials on the basis of properties affecting coupling coefficients, insertion losses and impedance matches for particular systems, according to general principles well known in the transducer art. Also, for very broad bands, filters tuned to slightly different resonant frequencies may be inserted in parallel.

The voltage engendered in strip 12 may be impressed on a load 26 by means of an electrode 27, terminal 28 and lead 29, load 26 being grounded, as at 30. Electrode 27 may consist of a fired or vapor-deposited coating of a silver or platinum composition over the entire lower face of strip 12, so that a thin deposit will provide ample conductivity without measurable effect on the resonance characteristic of member 10. For the same reason, and to minimize effect of vibration on the terminal 28, the latter is preferably located at or near a node, as shown.

As a matter of economical manufacture, the same combination of materials is preferably employed for various frequencies, to the greatest extent feasible. It is one of the salient advantages of our novel filter that such economy may be achieved in filters for a wide range of frequencies, by the simple expendients of varying the length of the resonant member and the position or manner of support. This facility of variation is particularly resultant from the simple shape in which the resonant member may be made, as exemplied by the strip form of member 10. For example, using the materials and thicknesses above stated as suitable for 255 c.p.s. with 7" length, a 2500 c.p.s. filter can be constructed with 1.76" length and supports 16, 17 positioned at the corresponding nodal planes, for flexural mode resonance.

Member 10 may also be excited to resonate in its longitudinal, width or thickness modes. For the proportions shown and described, the longitudinal mode proves quite practicable. The method of analysis above described in the development of Formula 6 is equally applicable to the development of a design formula for longitudinal mode, for which the basic formula is:

$$f_r = \sqrt{E}/2l\sqrt{\rho} \qquad (7)$$

Substituting for E and $\rho$ their equivalents of the composite member, transposing and reducing, Formula 7 becomes $$l = K_L/f_r \qquad (8)$$

in which $K_L$ is the longitudinal mode constant for any given combination of thicknesses and materials. For the combination used to exemplify FIG. 1, as above described, the value of $K_L$ is about 86,000. Thus, when member 10 is 7" long, it is fundamentally resonant in longitudinal mode at about 12.3 kc., but in free beam flexural mode at about 250 c.p.s.

The arrangement of FIG. 1 may be used for longitudinal mode excitation, if buffers 20, 21 are omitted. However, with supports 16, 17 located as there shown, or in any simple beam arrangement, there may be spurious or interfering response in some flexural mode, or a harmonic thereof. This circumstance may be particularly troublesome when member 10 is relatively short, in designs for higher frequencies, in which cases the flexural mode fundamental frequency is relatively closer to the longitudinal mode fundamental. Further, if supports 16, 17 are at the longitudinal nodes for a length which is an even multiple of the wave length at the pass frequency, the supports will damp the longitudinal mode. In many cases it may be difficult to select a length and corresponding support position which will provide minimal damping of longitudinal mode, yet effectively damp spurious frequencies in flexural modes.

In any case, it is desirable so as to support the resonant member that there is minimum lossiness when resonant in the desired mode and frequency, with maximum damping of the mode or modes in which the member may be resonant in response to possible spurious signals, noises or other sources of vibratory excitation.

Figure 5:
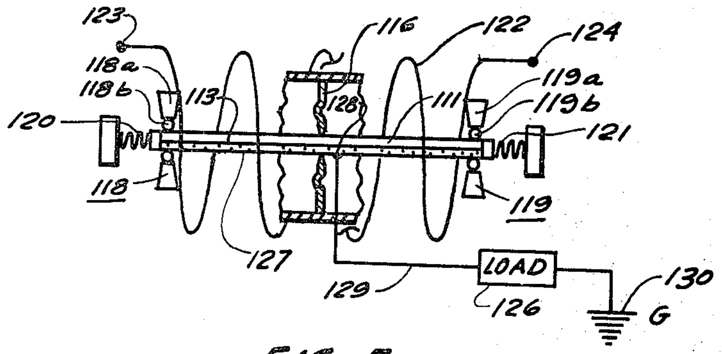
FIG. 5 illustrates another embodiment of our invention, for longitudinal mode response.

FIG. 5 illustrates a support structure suitable for longitudinal mode resonance, while providing maximum suppression of flexural modes with a beam member. Parts corresponding to those in FIGS. 1 and 2 are correspondingly numbered, with the addition of 100. The elongated member 110 consists of a magnetostrictive strip 111 bonded along the interface 113 to the electrostrictive strip 112. Member 110 is supported at or near its ends on antifriction mounts 118 and 119. Since in the free-free flexural mode, maximal deflections would occur at the ends and at the center of the beam, any tendency to respond in the flexural mode is restrained by confining the ends between upper and lower mount elements 118*a*, 118*b* and 119*a*, 119*b* at the ends, with restraint provided at the center by collar 116. Inasmuch as the transverse center plane of member 110 is the nodal plane for resonance in the longitudinal mode, the central collar 116 may be substantially of the same material and construction as the wafer 16 in FIG. 1, being stiff in the transverse plane, but allowing slight longitudinal or rotary motion with minimal resistance for aligning and centering upon the supports 118 and 119. Member 110 is held centered across supports 118 and 119 by means of equalizing springs 120 and 121, which should be lightly loaded in order to obviate damping in the longitudinal mode.

Member 110 is in the field of exciting coil 122, connected into the input circuit at terminals 123 and 124. When a pulsating magnetic field is established by a current passing through coil 122, strip 111 reacts magnetostrictively, peak amplitude being achieved when the field frequency corresponds to the fundamental resonant frequency of member 110 in its longitudinal mode. Unitary response of strips 111 and 112 is achieved by so proportioning the thicknesses of the respective strips, according to their respective moduli of elasticity, that a given value of strain is accompanied by stress in each strip corresponding to its respective elastic modulus. The thickness of electrostrictive strip 112 is selected to produce output voltage at a stress within the safe limits of the material used. In a manner similar to that employed for the form of FIG. 1, the outer face of strip 112 is provided with a conductive coating 127 and a collector terminal 128 at or near a node, in this case the midpoint of member 110, so that there is minimal disturbance of the output lead 129 at its connection to terminal 128. Lead 129 is connected to load 126, which is grounded at 130.

With the parallel strip form of FIG. 5, maximum coupling efficiency is achieved only when the thicknesses of the dissimilar strips are proportioned for uniform longitudinal strain across the composite cross section. There are some combinations of mode and frequency for which the form of FIGS. 1 or 5 may not be structurally or dimensionally practical. In such cases it may be desirable to couple the magnetostrictive and electrostrictive elements in tandem, shown for example in the form of FIG. 6, wherein parts corresponding to those of other forms are correspondingly numbered with the addition of 200. Member 210 consists of magnetostrictive strip 211 and electrostrictive strip 212 bonded together at face 213 in endwise abutting relationship. As seen, the strips 211 and 212 are of the same thickness. It will be understood that they are also of the same width, so that when strain is imposed on member 210, the stress imposed by longitudinal tension or compression is uniform throughout the length of member 210, without discontinuity of stress at the joint 213. The relative length of strips 211 and 212 is selected according to the respective moduli of elasticity, such that the longitudinal strain node occurs at the plane of the interface 213. Thus, when magnetostrictive strip 211 is excited by a pulsating field produced in coil 222, connected to the input current at terminals 223 and 224, a frequency of the input corresponding to the resonant frequency of the member 210 in its longitudinal mode will cause the member to resonate at that frequency with maximum amplitude. At nonresonant frequencies, for example a frequency corresponding to resonance of the strip 211 if alone, magnetically inert strip 212, being of substantial mass, damps any response of strip 211, so that such undesired frequency is substantially rejected.

Figure 6:
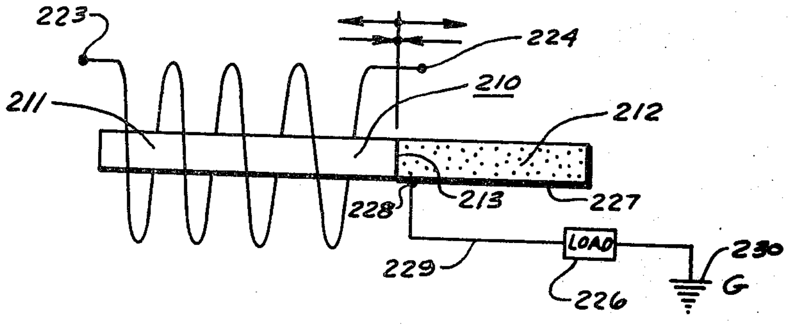
FIG. 6 illustrates yet another embodiment of our invention, for longitudinal mode response.

While there is theoretically no flexural excitation of member 210, in practice there may be a columnar effect in the compressive portion of the resonance cycle, which may result from slight bowing of the member, slight asymmetry of the grain structure in one or more transverse planes, or similar irregularities and deviations from theoretically true dimensions and structure. Therefore, the mounting used with the form of FIG. 6 is preferably that illustarted in FIG. 5. In an arrangement analogous to those of the other forms heretofore described, electrostrictive strip 212 is provided with a conductive face or coating 227 and a collector terminal 228, which latter is connected into the output line 229, impressing the generated voltage on load 226, grounded at 230.

While we have illustrated and described certain forms of this invention directed principally to flexural and longitudinal modes in proportions and mountings suitable for particular frequency bands, it will be readily understood by those skilled in the filter art that other forms, proportions and mountings for other frequencies and modes may be devised without departing from the spirit and scope of the invention as defined in the appended claims.

What we claim and desire to secure by Letters Patent is as follows:

1. An electromechanical filter comprising an elastically deformable composite member proportioned for resonance as a unit in predetermined mode at predetermined frequency and consisting essentially of a first element having magnetostrictive properties and a second element having electrostrictive properties, said elements being substantially coextensive at an interface and adherently bonded along substantially the entire extent of said interface, the cross-sections of said elements in all common planes normal to said interface being proportioned relatively according to the respective moduli of elasticity of the materials composing said elements so as to establish said interface in coincidence with a neutral stress zone in the principal stress pattern corresponding to elastic deformation of said member in said mode; means supporting said member for substantially uninhibited resonance in said mode; magnetic input means associated with said first element for exciting response thereof at said frequency; and means for electrically connecting said second element to an external load.

2. An electromechanical filter according to claim 1, including means for inhibiting shift of said member relative to said support means.

3. An electromechanical filter according to claim 2, including damping means for inhibiting resonance of said member in at least one mode other than said predetermined mode.

4. An electromechanical filter according to claim 3, wherein said damping means are constituted by substantial portions of said shift-inhibiting means.

5. An electromechanical filter comprising an elongated composite member proportioned and arranged for unitary resonance as a free-free beam in flexural mode, said member consisting essentially of first and second strip elements having coextensive opposed faces defining an interface lengthwise of said beam, said elements being formed respectively from a material having magnetostrictive properties and a material having piezo-electric properties, the thicknesses of said elements being so proportioned according to the respective moduli of elasticity as to establish said interface as the neutral principal axis of flexural stresses in said beam, said elements being adherently bonded along substantially the entire said interface; support means for said member positioned in nodal transverse planes thereof corresponding to said free-free beam mode; a coil surrounding said member and adapted to impress a magnetic field thereon for exciting response in said first element at said frequency, thereby effecting resonance of said member in said mode at said frequency; and means for electrically connecting said second element to an external load.

References Cited

UNITED STATES PATENTS

| | | | |
|---|---|---|---|
| 2,571,019 | 10/1951 | Donley et al. | 333—71 |
| 2,834,943 | 5/1958 | Grisdale et al. | 333—72 |

ROY LAKE, Primary Examiner

D. R. HOSTETTER, Assistant Examiner

U.S. Cl. X.R.

333—71